(12) United States Patent
Trichina

(10) Patent No.: US 7,970,129 B2
(45) Date of Patent: Jun. 28, 2011

(54) SELECTION OF A LOOKUP TABLE WITH DATA MASKED WITH A COMBINATION OF AN ADDITIVE AND MULTIPLICATIVE MASK

(75) Inventor: Elena Vasilievna Trichina, Munich (DE)

(73) Assignee: Spansion LLC, Sunnyvale, CA (US)

( * ) Notice: Subject to any disclaimer, the term of this patent is extended or adjusted under 35 U.S.C. 154(b) by 1104 days.

(21) Appl. No.: 11/788,264

(22) Filed: Apr. 19, 2007

(65) Prior Publication Data
US 2008/0260145 A1 Oct. 23, 2008

(51) Int. Cl.
H04L 9/00 (2006.01)
(52) U.S. Cl. .......................................... 380/28
(58) Field of Classification Search ............. 380/28
See application file for complete search history.

(56) References Cited

U.S. PATENT DOCUMENTS

| | | | |
|---|---|---|---|
| 6,295,606 B1 | 9/2001 | Messerges et al. | |
| 7,191,342 B1 | 3/2007 | New et al. | |
| 2001/0043082 A1* | 11/2001 | Wittig et al. | 326/39 |
| 2002/0012430 A1 | 1/2002 | Lim | |
| 2002/0110282 A1* | 8/2002 | Kraft et al. | 382/261 |
| 2003/0044003 A1* | 3/2003 | Chari et al. | 380/28 |
| 2003/0048903 A1 | 3/2003 | Ito et al. | |
| 2004/0228482 A1 | 11/2004 | Macchetti et al. | |
| 2005/0190857 A1 | 9/2005 | Braithwaite | |
| 2005/0283714 A1 | 12/2005 | Korkishko et al. | |

\* cited by examiner

*Primary Examiner* — Benjamin E Lanier
*Assistant Examiner* — Simon Kanaan

(57) ABSTRACT

Processing of masked data using multiple lookup tables (LUTs), or sub-tables, is described. For each input value, an appropriate sub-table provides an output value that is the result of a non-linear transformation (e.g., byte substitution) applied to the input value. An additive mask can be applied to the input data. A transformation can be applied to the masked input data to transform the additive mask into a multiplicative-additive mask. Selected bits of the masked input data and the bits in the additive component of the multiplicative-additive mask can be used in combination to select one of the sub-tables. An entry in the selected sub-table, corresponding to a transformed version of the input data, can then be identified.

17 Claims, 4 Drawing Sheets

US 7,970,129 B2

SELECTION OF A LOOKUP TABLE WITH DATA MASKED WITH A COMBINATION OF AN ADDITIVE AND MULTIPLICATIVE MASK

TECHNICAL FIELD

Embodiments in accordance with the present invention generally relate to data processing.

BACKGROUND ART

Many cryptographic algorithms include operations based on table lookups. For example, the Advanced Encryption Standard (AES) is a round-based block cipher used in security applications. Each round of the AES cryptographic process includes up to four operations, known in the art as AddRoundKey, ShiftRow, MixColumn and SubByte. The AddRoundKey, ShiftRow and MixColumn operations are linear operations, while the SubByte operation is a non-linear substitution step in which each byte of input data is replaced with another byte. The substitution may be made using a substitution table commonly referred to as the S-box and usually implemented as a lookup table (LUT).

Implementations of AES can be vulnerable to side channel attacks, also referred to as simple power analysis (SPA), differential power analysis (DPA) and electromagnetic analysis (EMA) attacks. Side channel attacks exploit information, such as power consumption and electromagnetic emission, that can leak from a device during execution of the cryptographic process. Adversaries enter different patterns of input data and monitor the side channel information in order to develop hypotheses about correlations between the side channel information and the device's internal state as the input data is encrypted. Using these correlations, an adversary can subsequently uncover a secret key used to encrypt data by monitoring side channel information as the data is encrypted.

One countermeasure to side channel attacks is to mask the input data and intermediate results with random values and execute operations on the masked data. The mask is usually additive—that is, the data is masked by applying an XOR (logical exclusive OR) operation with a random value (the mask). Both the data and the cryptographic key may be masked. For linear operations, the masked data and mask value can be processed independently, because for linear operations the following property holds: $F(A \text{ XOR } X) = F(A) \text{ XOR } F(X)$. Therefore, the result of a linear operation on original non-masked data can be obtained at the end of the operation by XOR-ing the result of the operation on the masked data and the result of the same operation on the value of the mask: $F(A) = F(A \text{ XOR } X) \text{ XOR } F(X)$. For non-linear operations, this property does not hold, and thus methods of manipulating masked data and mask values have to be derived.

One such method of mask manipulation may be referred to as simplified multiplicative masking. The input of the SubByte operation is an eight-bit input value A, masked with a random mask X (in other words, the value $A \text{ XOR } X$). The desired result of the SubByte transformation is $A^{-1} \text{ XOR } X$. In simplified multiplicative masking, a sequence of field operations is applied to the masked input value as follows:

1. $Y1 = (A \text{ XOR } X) * X = A * X \text{ XOR } X^2$ (multiplication is performed in the Galois field $GF(2^8)$; as a result of the multiplication, data A is now masked with multiplicative mask X and additive mask $X^2$);
2. $Y2 = Y1 \text{ XOR } X^2 = A * X$ (the additive mask is eliminated and only the multiplicative mask X remains);
3. $Y3 = (Y2)^{-1} = A^{-1} * X^{-1}$ (this operation is efficiently performed with a table lookup in the inversion table);
4. $Y4 = Y3 \text{ XOR } 1 = A^{-1} * X^{-1} \text{ XOR } 1$;
5. $Y5 = Y4 * X = A^{-1} * 1 \text{ XOR } X * 1 = A^{-1} \text{ XOR } X$ (multiplication in $GF(2^8)$ eliminates the multiplicative mask $X^{-1}$ and restores an original additive mask X).

Simplified multiplicative masking is vulnerable to side channel attacks referred to as "zero attacks" because a multiplicative mask does not mask an input value of zero. If an input value, which is at least partially controlled by an attacker, is zero, then the output of the SubByte operation will always be zero no matter what mask value is used, because $0^{-1} = 0$. Thus, a power analysis attack is possible, even when masking is used.

A solution that efficiently and securely addresses this vulnerability would be advantageous. Embodiments in accordance with the present invention provide these and other advantages.

DISCLOSURE OF THE INVENTION

Processing of masked data using multiple lookup tables (LUTs), or sub-tables, is described. For each input value, an appropriate sub-table provides an output value that is the result of a non-linear transformation (e.g., byte substitution) applied to the input value. An additive mask can be applied to the input data. According to embodiments of the present invention, a transformation can be applied to the masked input data to transform the additive mask into a multiplicative-additive mask. Selected bits of the masked input data and the bits in the additive component of the multiplicative-additive mask can be used in combination to select one of the sub-tables. An entry in the selected sub-table, corresponding to a transformed version of the input data, can then be identified.

These and other objects of the various embodiments of the present invention and their advantages will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
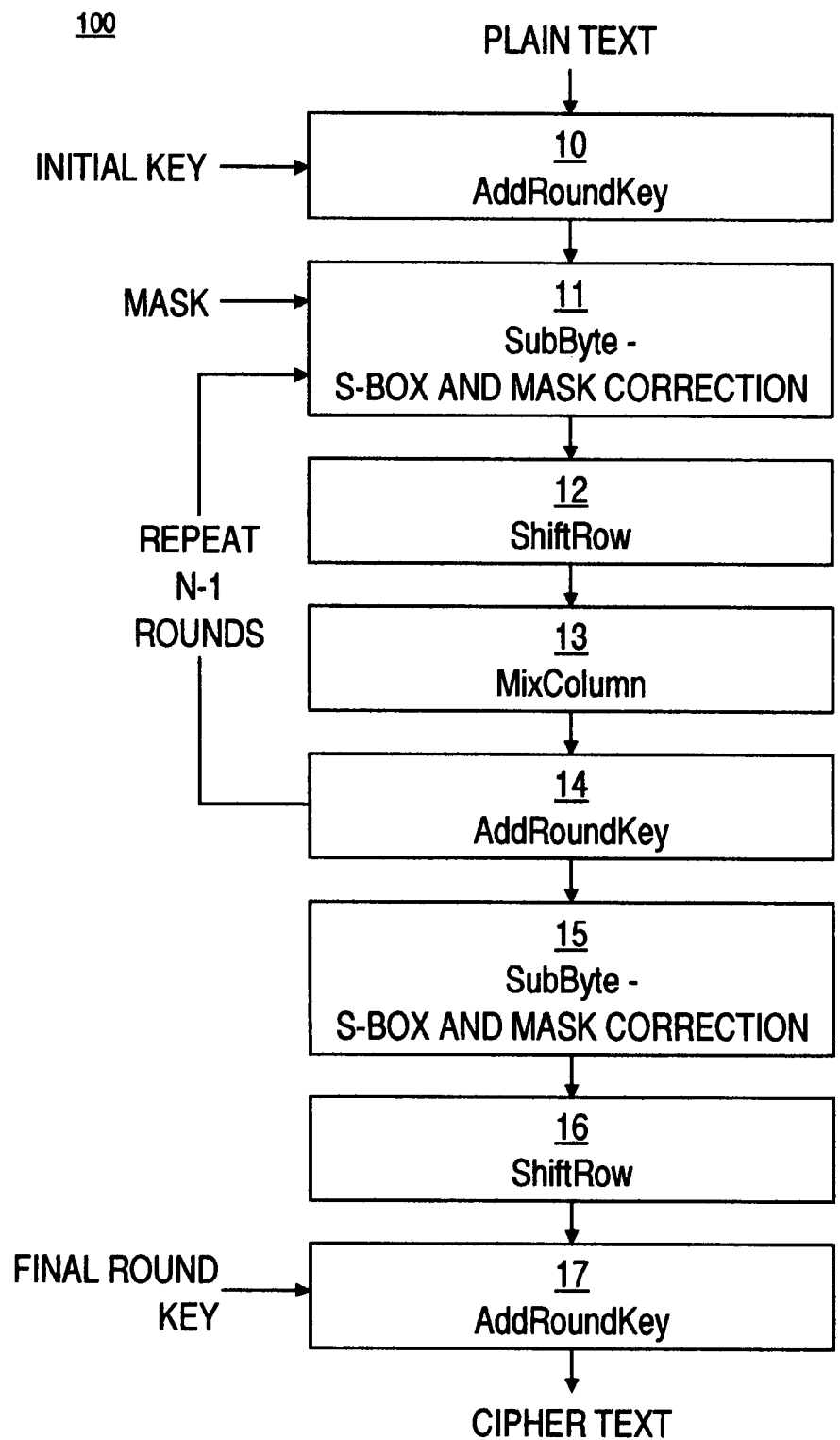
FIG. 1 is a flowchart showing data processing operations in an embodiment according to the present invention.

The drawings referred to in this description should be understood as not being drawn to scale except if specifically noted.

BEST MODES FOR CARRYING OUT THE INVENTION

Reference will now be made in detail to embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without these specific details. In other instances, well-known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "applying," "using," "locating," "generating," "identifying," "inverting," "masking," "operating on," "selecting," "decoding" or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

FIG. 1 is a flowchart 100 showing data processing operations in an embodiment according to the present invention. In particular, flowchart 100 pertains to a process for encrypting data according to an Advanced Encryption Standard (AES) cipher. However, as will be seen, embodiments in accordance with the present invention are not limited to AES ciphers or even encryption applications.

AES is a round-based symmetric block cipher. The standard key size is 128 bits, but for some applications 192-bit and 256-bit keys are also supported. A round consists of four (4) different operations—SubByte, ShiftRow, MixColumn and AddRoundKey—that are performed repeatedly in a certain sequence. Each operation maps a 128-bit input "state" into a 128-bit output state. Each state is represented as a 4×4 matrix of bytes. The number of rounds N depends on the key size. In the last round, the MixColumn operation is omitted, and prior to the main loop, the AddRoundKey operation is executed for initialization.

In block 10 of FIG. 1, an initial key is computed in a known fashion. Either the key or the plain text input data or both the plain text input data and the key are masked with some random masks using, for example, an XOR operation. The key can be combined with the plain text input data using, for example, an XOR operation.

In block 11, each byte of masked data is replaced with another byte using an S-box. In one embodiment, the S-box is the result of a composite of two (2) transformations. First, each byte in a state is replaced with its reciprocal in the finite field (Galois field) $GF(2^8)$. The zero byte value, which has no reciprocal, is replaced by itself. Second, an affine transformation, consisting of a bitwise matrix multiply with a fixed 8×8 binary matrix followed by an XOR operation, is applied.

In the present embodiment, the S-box is implemented using multiple, smaller lookup tables (LUTs) instead of a single, larger LUT. The smaller LUTs may be referred to herein as sub-tables. In one embodiment, instead of using a single LUT consisting of 256 entries, 16 smaller LUTs, each sub-table containing 16 entries, are used. In one embodiment, each entry is eight (8) bits wide. The use of 16 sub-tables, each sub-table containing 16 8-bit entries, minimizes silicon area and also minimizes power consumption.

In general, if the larger LUT contains P entries (where P is often some power of 2, e.g., $P=2^8=256$ for AES), then the LUT can be split into J sub-tables, each sub-table having an equal number of entries. Usually J is also some power of 2 ($J=2^k$, $0<k<n$, where 'n' is the number of bits in the input data; $J=2^4=16$ for the embodiment described above), in which case the number of bits in the selector signal used to select one of the sub-tables is $k=\log(J)$. Thus, for AES, one lookup table with $2^8=256$ 8-bit entries can be split into 2 sub-tables, each with 128 8-bit entries, or into 4 sub-tables, each with 64 8-bit entries, or 8 sub-tables each with 32 entries, or 16 sub-tables each with 16 bit entries, or 32 sub-tables each with 8 entries, or 32 sub-tables each with 4 entries, or 62 sub-tables with 2 entries each. Then, a table lookup operation consists of two steps: (1) select a correct sub-table among the plurality of sub-tables; and (2) find a result of the substitution by lookup in the selected sub-table. In one embodiment, both steps have as inputs a 1-bit enable signal and some part of the original masked data that is used as a selector signal. The first step has a selector signal which is a k-bit slice of the n-bit input data (as will be seen by the discussion below, n-bit input data is masked with a combination of a k-bit additive mask and an n-bit multiplicative mask). The selector signal of the second step is the remaining n−k (n minus k) bits of the masked input data.

Although an example where $2^k$ ($0<k<n$) sub-tables are obtained by grouping $2^{n-k}$ subsequent entries of the original lookup table is used in the discussion below, any reasonable permutation of entries in the original table can be considered, provided that the selector signals are transformed accordingly.

According to embodiments of the present invention, in order to increase the difficulty of a zero attack on the inversion in the Galois Field, simplified multiplicative masking is combined with an additive mask. In general, the number of bits in the additive mask is $k=\log(J)$, where J is the number of sub-tables as mentioned above, and where the number of bits in the multiplicative mask is 'n.' In one embodiment, the input of the SubByte operation is an 8-bit input value A masked with an 8-bit random mask X, and the new additive mask is 4 bits wide. The desired result of the SubByte transformation is $A^{-1}$ XOR X. In one such embodiment, simplified multiplicative masking is combined with an additive mask as follows:

1. $Y1=(A\ XOR\ X)*X=A*X\ XOR\ X^2$;
2. $Y2=Y1\ XOR\ (X^2\ AND\ ffx00)=A*X\ XOR\ Z$ (e.g., an n-bit additive mask $X^2$ is transformed into a k-bit additive mask Z, where $Z=X^2\ AND\ ffx00$);
3. $Y3=M(Y2)^{-1}=A^{-1}*X^{-1}$ (where M is used to indicate that the table lookup is a lookup with the additive mask, which is processed by a cascade of de-multiplexers as described in conjunction with FIGS. 3, 4 and 5, below);
4. $Y4=Y3\ XOR\ 1=A^{-1}*X^{-1}\ XOR\ 1$;
5. $Y5=Y4*X=A^{-1}\ XOR\ X$.

However, in step 2 above, a more general approach can be utilized to transform an n-bit additive mask $X^2$ into any k-bit mask. This can be done by first executing $Y2'=Y1\ XOR\ (X^2\ XOR\ Z1)$, where Z1 is a new 8-bit random mask. In general, the more random values used the better, but generating new random values can be costly in terms of both time and memory. Then 'k' positions are selected from among n-bit positions in the input value $[X_{n-1}, X_{n-2}, \ldots, X_0]$ that is to be masked with a k-bit additive mask; let those positions be n-i1, n-i2, . . . , n-ik, where $0<i1<i2<\ldots<ik<8$. Next, by performing an AND operation of Y2' with a fixed n-bit value Z2, where Z2 is chosen such that it has bits valued 1 at positions n-i1, n-i2, . . . , n-ik, and bits valued 0 at all other positions, a k-bit additive mask is obtained where bits of the mask are not consecutive. Therefore, $Y2=Y1\ AND\ Z2$ is computed instead of computing $Y2'=Y1\ XOR\ Z1$ and $Y2=Y2'\ AND\ Z2$, where Z2 is as described above. In other words, the k-bit additive mask Z is computed as $Z=X^2\ AND\ Z2$.

According to embodiments of the present invention, step 3 above is implemented using a modified table lookup process referred to herein as a "swap" operation. In the process, the additive mask Z is eliminated, and so there is no need for mask correction. The swap operation is described in more detail in conjunction with FIG. 2, below.

In one embodiment, instead of performing step 4 separately from the lookup of step 3, each entry in the sub-tables is XORed a priori with the value 1. Thus, the sub-tables are synthesized such that each input value A has an output value ($A^{-1}\ XOR\ 1$). Consequently, the difficulty of a zero attack is increased because there are at least 8 values with a Hamming weight of 1. Furthermore, the propagation delay is reduced.

Continuing with reference to FIG. 1, in block 12 of the present embodiment, a cyclic shift operation is applied to each of four rows in a 4×4 byte state using 0 . . . 3 offsets.

In block 13, in the present embodiment, 4-byte data blocks in each column of a state are treated as coefficients of a 4-term polynomial and multiplied modulo $x^4+1$ with a fixed polynomial $c(x)=\{03\}x^3+\{01\}x^2+\{01\}x+\{02\}$.

In block 14, in the present embodiment, a bit-wise XOR operation is performed on the 128-bit round key and the data.

Blocks 11 through 14 can be repeated for N−1 rounds. The results of the SubByte operation (e.g., block 11) can be masked with a new randomly generated mask sometime after the SubByte operation. New masks may or may not be applied in the blocks 12, 13 and 14. Masked values and masks are processed in blocks 12, 13 and 14 in a conventional manner, with mask correction performed in parallel.

In the present embodiment, the final round (round N) includes blocks 15, 16 and 17. In blocks 15, 16 and 17, the same operations described previously for blocks 11, 12 and 14, respectively, are performed to yield the encrypted data (cipher text).

Figure 2:
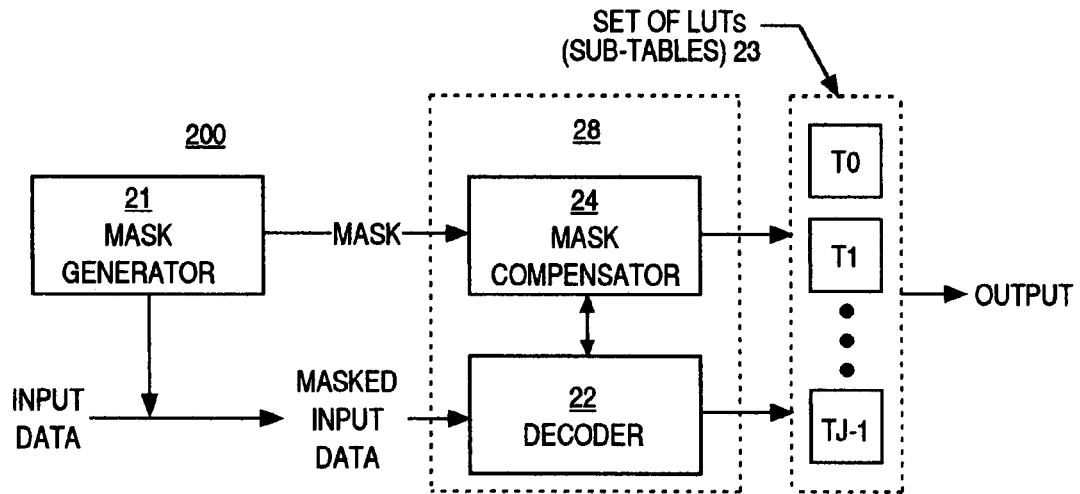
FIG. 2 is a block diagram of a data processing system in an embodiment according to the present invention.

FIG. 2 is a functional block diagram of a data processing system 200 in an embodiment according to the present invention. In one embodiment, system 200 is utilized in blocks 11 and 15 of FIG. 1.

In the example of FIG. 2, system 200 includes a mask generator 21, a decoder 22, a set of LUTs 23, and a mask compensator 24. System 200 may include elements in addition to those just mentioned. Also, in the discussion below, the elements of system 200 are discussed according to the functions they perform; however, functions described as being performed by multiple elements may be implemented as a single element, and vice versa. For example, mask compensator 24 can be integrated (e.g., interleaved) with decoder 22 as described in conjunction with FIGS. 3 and 4, below. Alternatively, mask compensator 24 can be implemented in series with decoder 22 as described in conjunction with FIG. 5, below. Decoder 22 and mask compensator 24, whether implemented in series or interleaved, may be collectively referred to herein as augmented decoder 28 for simplicity of discussion.

In general, mask generator 21 of FIG. 2 generates a mask that is applied to input data to generate masked input data. In one embodiment, mask generator 21 implements the steps 1 and 2 mentioned in conjunction with FIG. 1, above.

Continuing with reference to FIG. 2, the set of LUTs 23 includes a number of smaller sub-tables T0, T1, . . . , TJ−1 instead of a single, larger LUT, as previously described herein. In one embodiment, there are 16 sub-tables (J=16). Access to the set of LUTs 23 is via de-multiplexing, which effectively distributes a source signal (e.g., a read-enable signal) onto one of several possible destinations according to the value of a selector signal. For fields of size $2^n$, the number of sub-tables is $2^k$, where $0<k<n$.

Decoder 22 and mask compensator 24, in combination, use the n-bit masked input data and a k-bit additive mask to select a sub-table from the set of LUTs 23, and also to identify an entry in the selected sub-table. In one embodiment, decoder 22 and mask compensator 24 implement step 2 discussed in conjunction with FIG. 1, above.

As mentioned above, a modified table lookup process referred to herein as a swap operation is used to select a sub-table from the set of LUTs 23. In a swap operation, one sub-table is essentially swapped with another sub-table, although in actual practice the sub-tables are not physically swapped. Rather, the addresses or indices of the sub-tables are exchanged according to the bit values of an additive mask.

Consider an example of a 256-entry S-box LUT implemented as 16 sub-tables, each sub-table containing 16 8-bit subsequent entries. The first sub-table (T0) contains entries that would have had indexes 0-15 in the 256-entry LUT; the second sub-table (T1) contains entries that would have had indexes 16-31 in the 256-entry LUT, and so on. Suppose that the input data is masked with a 4-bit additive mask (which can be considered as an extension of an 8-bit mask Z2 where, for example, the 4 MSBs of the mask are randomly selected, and the 4 LSBs of the mask are zero). For example, consider an input value of 00000011 (or 3) that is masked with 10000000, yielding a masked input value of 10000011 (or 131). The S-box value for 3 is stored as the fourth entry in sub-table T0, while the S-box value for 131 is stored as the fourth entry in sub-table T8. Thus, to determine the correct result of the lookup in the sub-tables for an input value masked with an additive mask 1xxx0000, the sub-tables T0 and T8 would have to be swapped.

As mentioned above, the set of LUTs 23 (FIG. 2) is not rearranged in actual practice. Instead, as described in further detail in conjunction with FIGS. 3, 4 and 5 below, the masked input data is acted on using a cascade of multiplexers that are controlled according to the bit values of the mask. The multiplexers manipulate the masked input data under control of the bit values of the mask to select one of the sub-tables in the set of LUTs 23.

Accordingly, the set of LUTs 23 does not need to be reprogrammed for different mask values. Moreover, according to embodiments of the present invention, the same set of LUTs 23 can be used even if the mask is changed; that is, there is no need to recompute values of the S-box for a new mask. Thus, the set of LUTs 23 may be implemented in hardware as read-only memory (ROM), synthesized logic using standard cells, or customized logic.

Figure 3:
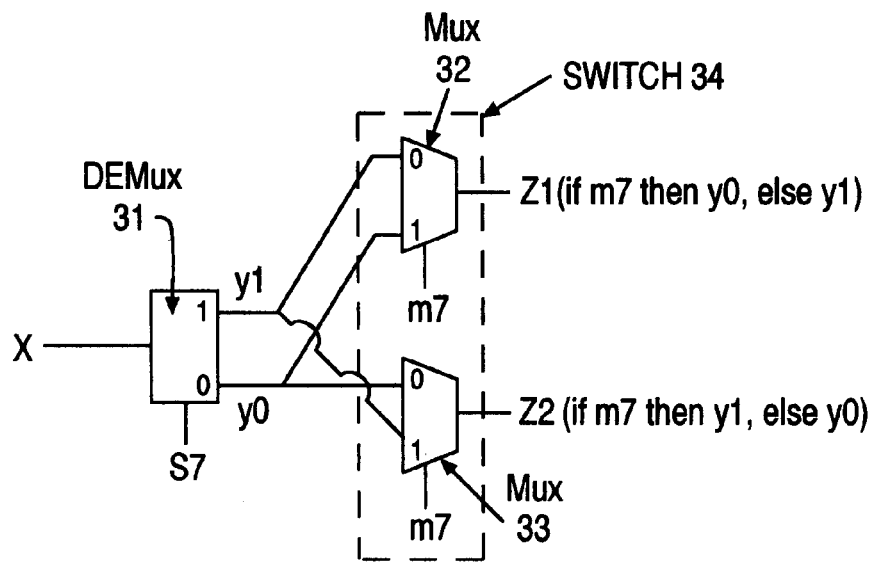
FIG. 3 illustrates a cascade of de-multiplexers and multiplexers in an embodiment according to the present invention.

In one embodiment, decoder 22 and mask compensator 24 include levels or stages of multiplexers and de-multiplexers that implement the swap operations described above. FIG. 3 illustrates one embodiment in which decoder 22 and mask compensator 24 of FIG. 2 are interleaved. In the example of FIG. 3, a de-multiplexer 31 is coupled to a multiplexer 32 and a multiplexer 33. In the example of FIG. 3, de-multiplexer 31 and multiplexers 32 and 33 represent the first stage of augmented decoder 28. One stage of the augmented decoder 28 has as an input an enabler signal 'x' and two selector signals denoted s7 and m7 in FIG. 3. The first selector signal, s7, is a bit of the masked input data and controls de-multiplexer 31. The second selector signal, m7, is a corresponding bit of the k-bit additive mask and controls both multiplexers 32 and 33. Essentially, multiplexer 32 and multiplexer 33 together form a switch 34, which either "swaps" the outputs y0 and y1 of the de-multiplexer 31, or does not, depending on the value of the bit of the mask m7 according to the following formula: z1 :=(if m7=1 then y0 else y1) and z2 :=(if m7=1 then y1 else y0). Decoders with multiple stages can be formed using the configuration of FIG. 3 as a building block.

Continuing with reference to FIG. 3 and with reference also to FIG. 2, a sub-table corresponding to an input value 's' can be selected from the set of LUTs 23 as follows. Consider again the example of a 256-entry S-box LUT implemented as 16 sub-tables, each sub-table containing 16 8-bit entries. Sub-table T0 would have address 0, sub-table T1 would have address 1, and so on. The 4 MSBs of the input value would indicate the address of the appropriate sub-table, and the 4 LSBs of the input value would indicate the appropriate entry within the selected sub-table.

In this example, the appropriate sub-table can be selected using a 1-to-16 de-multiplexer (or decoder), using the 4 MSBs of the input value 's' as a selector signal. In essence, de-multiplexing distributes a source signal 'x' (e.g., a read-enable signal) onto one of several possible destinations $y_i$ according to the value of a selector signal 's.' Thus, the selector signal 's' denotes an index or address for a sub-table. Using a standard binary encoding for $s=s0*2^0+s1*2^1+\ldots+si*2^i+\ldots$, the de-multiplexer function can be expressed as $y_i$=(if i=s then x else 0), or $y_i$=x*(i=s).

If the source signal 'x' is held constant with a value of 1, then the output $y_s$ is equal to 1 and all other outputs are zero. Thus, to read from one of 16 possible sub-tables, for example, a read-enable signal 'x' is given as an input to a 1-to-16 decoder (which may be implemented as a cascade of de-multiplexers, as described below). The selector signal 's' (which is used to select one of the sub-tables) corresponds to the 4 MSBs of the input data (the pre-mask input data) to be transformed, which is the index 'i' to the single, large (256-entry) S-box LUT, $i=s0*2^0+s1*2^1+\ldots+s7*2^7$. A decoder output of 1 selects a sub-table that contains entries with the 4 MSBs of the index equal to [s7, s6, s5, s4]. The values of the read-enable signal 'x' for all other sub-tables would be 0. In the example above, the 4 LSBs of the index 'i' (namely, [s3, s2, s1, s0]) correspond to the desired (correct) entry in the selected sub-table.

When the 4 MSBs of the input data are masked with random bits, then instead of selector values [s7, s6, s5, s4], the selector values are [s7 XOR m7, s6 XOR m6, s5 XOR m5, s4 XOR m4], where m7, m6, m5 and m4 are the 4 MSBs of an 8-bit mask. To select the correct sub-table (that is, the sub-table that contains the entry that corresponds to the pre-mask input data), the mask bits m7, m6, m5 and m4 are used in the mask compensator 24 (FIG. 2) as described below.

Consider an example in which the input value 's' is masked with the additive (XOR) mask 10000000; that is, the input bit s7 is masked with 1 and all the other input bits are masked with 0. If, for example, the original value of bit s7 was 0, then the masked signal (s7 XOR 1) would be equal to 1. Thus, one of the sub-tables T8-T15 would be selected instead of one of the sub-tables T0-T7. Similarly, if the original value of bit s7 was 1, then the masked input signal (s7 XOR 1) would be equal to zero, meaning that one of the sub-tables T0-T7 would be selected instead of one of the sub-tables T8-T15.

In the example of FIG. 3, to compensate for the mask M, a swap operation is implemented by swapping the output of de-multiplexer 31. In one embodiment, this is achieved using the two multiplexers 32 and 33 coupled downstream of de-multiplexer 31. The configuration that includes the two multiplexers 32 and 33 with two read-enable signals y0 and y1, one control signal 'm' and two read-enable outputs z1 and z2 is referred to herein as switch 34.

For a swap operation, at any level 'i' in the cascade of 2-to-2 decoders, the outputs y0 and y1 of each de-multiplexer 31 are provided as pair-wise inputs to two multiplexers 32 and 33 under control of the corresponding mask bit m(i). The multiplexers "invert" the value of the output if m(i) is equal to 1, and do not change the output otherwise.

In the example of FIG. 3, the multiplexers 32 and 33 are controlled by the value of the mask bit m7 (the selector signal is bit m7). Each of the outputs of de-multiplexer 31 is copied, with one copy connected to the 1-input of multiplexer 32 and the other copy connected to the 0-input of multiplexer 33, as shown in FIG. 3. If bit m7 is 0, then multiplexer 32 selects the first output of de-multiplexer 31 and multiplexer 33 selects the second output of de-multiplexer 31; that is, the outputs are not swapped. If bit m7 is 1, then multiplexer 32 selects the second output of de-multiplexer 31 and multiplexer 33 selects the first output of de-multiplexer 31; that is, the outputs are swapped.

The de-multiplexer 31 and multiplexers 32 and 33 constitute a 2-to-2 decoder (also referred to previously herein as an augmented decoder). Larger decoders can be formed using the 2-to-2 decoder of FIG. 3 as a building block. For example, an 1-to-16 decoder can be represented as a 4-level cascade of 2-to-2 decoders. The first level would include a single 2-to-2 decoder, the next level would include two 2-to-2 decoders, and so on. At any level 'i' in the cascade of 2-to-2 decoders, there would be $2^i$ 2-to-2 decoders. For a 4-bit mask, 30 multiplexers and 15 de-multiplexers are required for the swap operation described herein.

Figure 4:
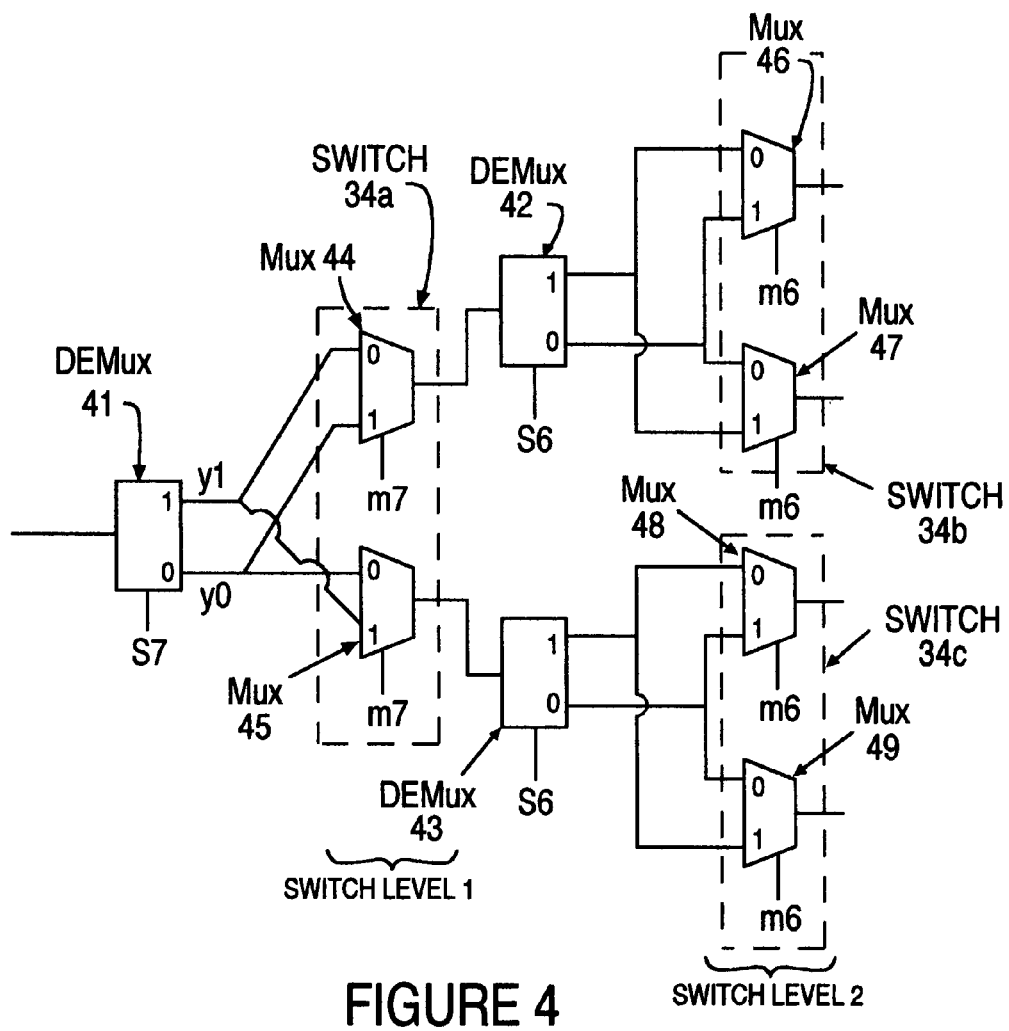
FIG. 4 illustrates a cascade of de-multiplexers and multiplexers in another embodiment according to the present invention.

FIG. 4 illustrates a 2-to-4 decoder (an augmented decoder) that includes a two-level cascade of de-multiplexers 41, 42 and 43 and multiplexers 44, 45, 46, 47, 48 and 49 in another embodiment according to the present invention. The configuration that includes the two multiplexers 44 and 45 can be referred to as switch 34a, the two multiplexers 46 and 47 can be referred to as switch 34b, and the two multiplexers 48 and 49 can be referred to as switch 34c. In the example of FIG. 4, switch 34a constitutes switch level 1, and switches 34b and 34c constitute switch level 2. The 2-to-2 decoder that includes de-multiplexer 41 and multiplexers 44 and 45 constitutes a first level of augmented decoder 28 of FIG. 2. The two 2-to-2 decoders that include, respectively, de-multiplexer 42 and multiplexers 46 and 47, and de-multiplexer 43 and multiplexers 48 and 49, constitute the second level of the augmented decoder 28. In one embodiment, for a swap operation, the outputs y0 and y1 of de-multiplexer 41 are provided as pair-wise inputs to the two multiplexers 44 and 45.

At each level 't' ($1 \leq t \leq k$) of the cascade of de-multiplexers and multiplexers, the "level 't' switch" includes $2^t$ multiplexers (or in other words, a level 't' switch includes $2^{t-1}$ level 1 switches 34a), where each of the multiplexers has two inputs and two outputs. Each switch level has $2^k$ inputs and produces $2^k$ outputs by either switching the values of the groups of inputs or not, depending on the selector bit of the additive mask. The groups of inputs that are manipulated at the stage 't' of the cascade are formed from consecutive inputs to the stage 't' in this cascade so that $2^t$ consecutive inputs are given as inputs to the particular level 't' switch.

In the general case where a k-bit additive mask is used such that it masks fixed but not consecutive bits of an n-bit input value—in other words, for n-bit input value $[X_{n-1}, X_{-2}, \ldots, X_0]$ only bits at positions n–i1, n–i2, . . . , n–ik are masked (where $0<i1<i2<\ldots<ik<n$)—the augmented decoder 28 may be represented as an n-level cascade of de-multiplexers that form decoder 22, where only de-multiplexers at levels that have selector signals $X_{n-i1}, X_{n-i2}, \ldots, X_{n-ik}$ are followed downstream by the switches that include the multiplexers with selector signals that correspond to the corresponding bits of the k-bit additive mask. De-multiplexers at other levels are not followed by switches. Although such an augmented decoder is possible, the case in which the k-bit additive mask masks consecutive bits of the input value is more efficient and less cumbersome.

Figure 5:
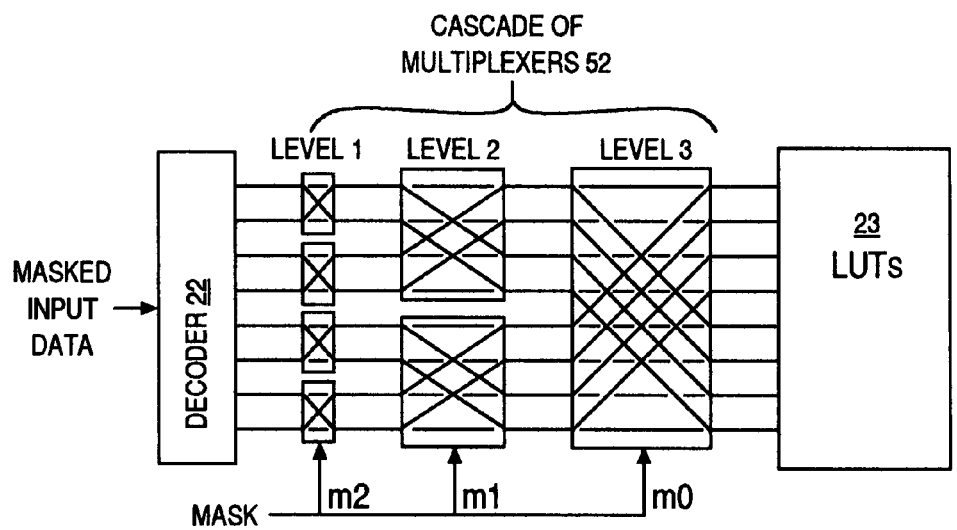
FIG. 5 illustrates a cascade of multiplexers following a decoder according to various embodiments of the present invention.

In the examples of FIGS. 3 and 4, the de-multiplexers and multiplexers are interleaved; that is, the decoder 22 and mask compensator 24 of FIG. 2 are integrated. FIG. 5 illustrates a cascade of multiplexers 52 following decoder 22 in another embodiment of the present invention. In such an embodiment, decoder 22 includes a cascade of de-multiplexers that perform swap operations on the pairs of outputs of decoder 22. In the example of FIG. 5, instead of implementing multiplexers within each level of the decoder 22 as in the examples of FIGS. 3 and 4, the multiplexers 52 are implemented as a cascade following the de-multiplexers. In the example of FIG. 5, only three levels of multiplexers are illustrated.

In the example of FIG. 5, the cascade of de-multiplexers that constitute the decoder 22 are followed by a cascade of de-multiplexers 52 that constitute mask compensator 24 of FIG. 2. The decoder 22 may be an n-to-$2^n$ decoder that is used for accessing an LUT with n-bit input data. The mask compensator 24 takes $2^n$ outputs of the decoder 22 as one input, and the n-bit mask as a second (e.g., selector) input. In the present embodiment, the mask compensator 24 represents an n-level cascade of multiplexers 52. At each level 'i' (i= 1, . . . , n) of the cascade of multiplexers 52 representing mask compensator 24, there are $2^n$ 1-bit read-enable signals and one 1-bit selector signal. The selector signal represents one bit of the mask value. At each level of the cascade of multiplexers 52 of mask compensator 24, there are exactly $2^{n-1}$ switches 34 (FIG. 3).

To generalize, each "level t" switch consists of $2^t$ multiplexers (with $1 \leq t \leq k$). The inputs to the level 't' switch is formed from the $2^k$ inputs to the level 't' of the cascade 52 as follows: i) split $2^k$ inputs into $2^{k-t}$ groups, each group with $2^t$ consecutive inputs from the sequence of all $2^k$ inputs; and ii) in each group of inputs of the "level t" switch, all inputs are split pair-wise so that the inputs (i, i+$2^{t-1}$) are given as two inputs to the i-th multiplexer that forms the switch, i=1, . . . , $2^t$.

In some of the examples above, the 4 MSBs of the input data are masked; however, the present invention is not so limited. Instead of masking the 4 MSBs, any 'k' bits of the 8 bits of the input data can be masked. In other words, any mask that has zeroes as n–k (n minus k) of its bit values, with the other 'k' bit values randomly generated, can be used. In general, only the decoders (de-multiplexers) on the levels of the cascade of decoders (described above in conjunctions with FIGS. 3, 4 and 5) that correspond to the positions of the randomly generated bit values would swap their outputs depending on the value of the corresponding bit of the mask.

In general, the number of bits in an additive mask depends on the number of sub-tables. If the input data includes 'n' bits, then the larger LUT would include $2^n$ entries (for AES, n=8). The LUT can be split into J sub-tables of equal size, each sub-table containing 'j' entries, such that $2^n=J*j$ If there are $2^k$ sub-tables (J=$2^k$), then there are at least 'k' bits (or generally, log(J) bits) in the additive mask that are used to select one of the sub-tables, and the other n–k bits (or generally, log(j) bits) are used to locate an entry in the selected LUT. k=n/2 is selected as a compromise between the size of the input parameter (e.g., 8 bits), the security provided by the mask (e.g., 4 bits), and the efficiency of a practical implementation in hardware.

Figure 6:
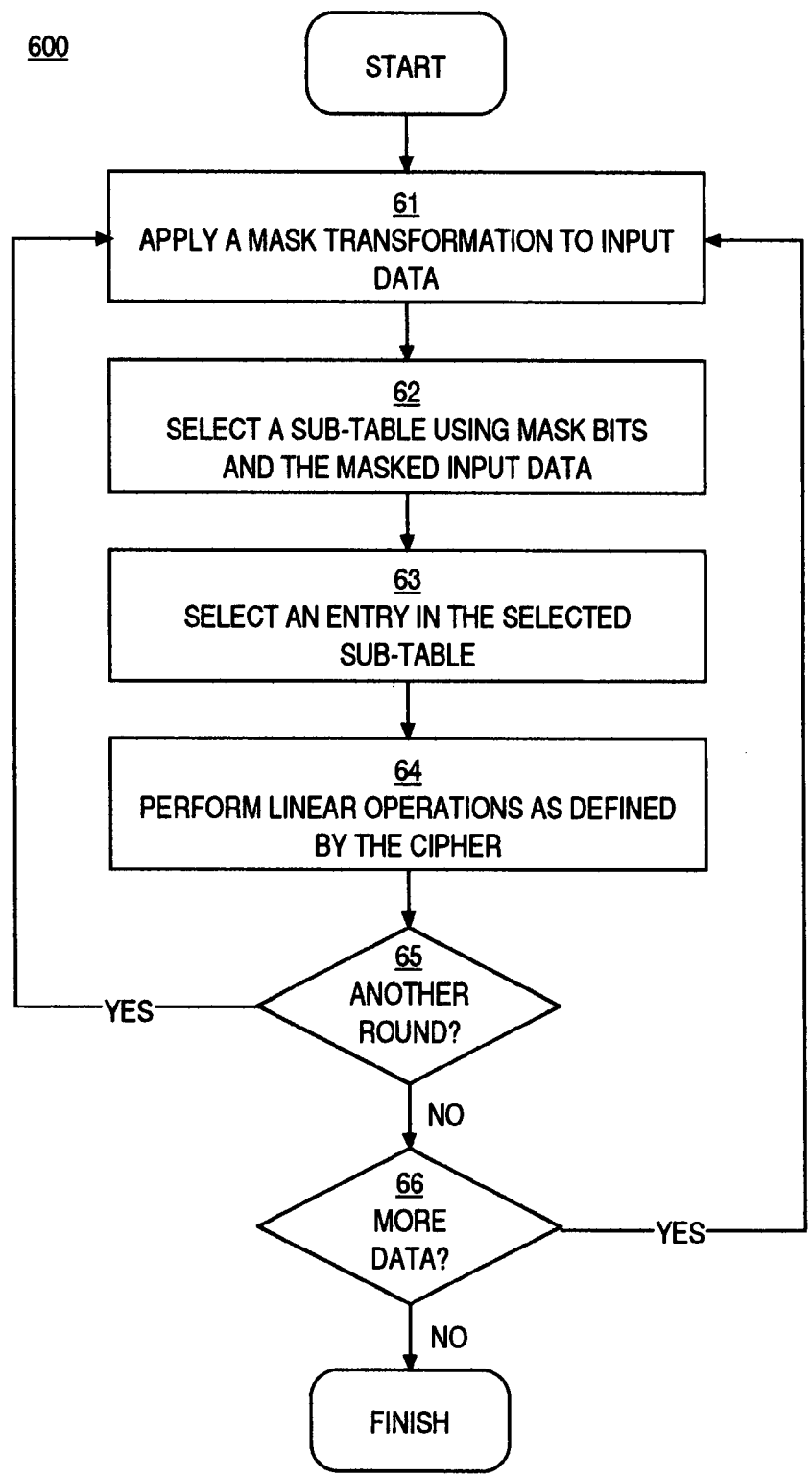
FIG. 6 is a flowchart of a data processing method in an embodiment according to the present invention.

FIG. 6 is a flowchart 600 of a data processing method in an embodiment according to the present invention. Although specific steps are disclosed in flowchart 600, such steps are exemplary. That is, embodiments of the present invention are well-suited to performing various other steps or variations of the steps recited in flowchart 600. The steps in flowchart 600 may be performed in an order different than presented, and not all of the steps in flowchart 600 may be performed.

In block 61, a mask transformation is applied to input data, resulting in a new additive mask. In particular, the input data may be masked with another mask, in which case the transformation replaces the input additive mask with a multiplicative-additive mask (see step 2 discussed in conjunction with block 11 of FIG. 1, above). In one embodiment, if the original mask consists of 'n' bits, then it can be transformed into an n-bit multiplicative mask and a k-bit additive mask. In other words, certain 'k' bits of the new additive mask are randomly generated and the other n–k mask bits are zero. In one such embodiment, the new multiplicative-additive mask is 8 bits wide, and the 4 MSBs of the additive mask are randomly generated while the 4 LSBs of the additive mask are each zero, which effectively corresponds to a 4-bit additive mask that masks the 4 MSBs of the input data (which, in turn, is masked with an 8-bit multiplicative mask). The masked input data is to be transformed byte-by-byte in a nonlinear manner using an S-box that is implemented as a number of LUTs or sub-tables.

In block 62, using the additive component of the multiplicative-additive mask and selected bits of the masked input data in combination, one of the sub-tables is selected. In general, certain bit values of the multiplicative-additive mask are used to manipulate corresponding read-enable bits, while selected bits of the masked input data are used as a selector signal, in order to implement a swap operation as previously described herein, thereby deriving an index or address for one of the sub-tables.

In block 63 of FIG. 6, an entry in the selected sub-table is identified. The entry represents a transformed version of the corresponding byte of the input data.

In one embodiment, the 4 MSBs of the masked input data and the additive component of the multiplicative-additive mask are used in combination to select a sub-table, and the 4 LSBs of the masked input data are used to index the entry. In general, the 'n' bits of the masked input data can be split into two non-overlapping subsets of 'k' bits each, with the first subset (e.g., the n/2 MSBs) used with the additive component of the multiplicative-additive mask to select a sub-table, and the second subset (e.g., the n/2 LSBs) used to select an entry in the selected sub-table.

Blocks 62 and 63 can be implemented in series or in an interleaved manner, as described above in conjunction with FIGS. 2-5.

In block 64, the results obtained in block 63 are processed as required by the cipher. For example, the processing may include the linear operations described in blocks 12, 13 and 14 of FIG. 1. The output(s) of block 63 may or may not be masked. If they are masked, the mask correction for each linear operation constitutes execution of the linear operation on the bits of the mask in parallel with execution of the linear operation on the masked data.

In block 65 of FIG. 6, in an AES embodiment, if there is another round, then flowchart 600 returns to block 61. The same set of LUTs (sub-tables) can be used for each round, even if the mask changes from round to round. If there are no other rounds, flowchart 600 proceeds to block 66.

In block 66, if there is additional data to process, then flowchart 600 returns to block 61. The same set of LUTs (sub-tables) can be used for different input data and for different masks. If there is no other data, flowchart 600 concludes.

To summarize, embodiments in accordance with the present invention provide an effective countermeasure against side channel attacks. The methods described herein do not alter considerably a conventional data path, are comparable in gate count with data masking in composite fields, and have approximately 4 times less propagation delay.

Also, according to embodiments of the present invention, the same LUT can be used even if the multiplicative-additive mask is changed; that is, there is no need to recompute values of the S-box for a new mask. Thus, the LUT may be implemented in hardware as ROM, synthesized logic using standard cells, or customized logic. Also, because each byte of input data can be masked with a different mask, the noise-to-signal ratio of the encrypting device is increased, hindering power analysis attacks.

Moreover, the power consumption of an S-box implemented as a set of LUTs as described herein is substantially less than the power consumption of a conventional S-box implemented in a composite field. This is due to high switching activity of the gates in the latter case versus almost no switching activity in the former case.

Embodiments according to the present invention are not limited to AES and can be extended to other ciphers that use S-box tables, such as the Data Encryption Standard (DES) and Triple DES.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A data processing method comprising:
applying a transformation to randomly masked input data comprising input data that is masked with a random additive mask, wherein said transformation replaces said additive mask with a multiplicative-additive mask comprising an additive component, wherein said additive component comprises k bits and said input data comprises n bits;
using a first subset of said masked input data and said additive component of said multiplicative-additive mask in combination to select a lookup table (LUT) from a plurality of LUTs, wherein there are up to $2^k$ LUTs in said plurality of LUTs and up to $2^{n-k}$ entries per LUT, wherein said LUT is selected using a swap operation in which indices of said LUTs are exchanged according to bit values of said additive mask, wherein k bits of said masked input data are used with said additive component to select said LUT; and
using a second subset of said masked input data to select an entry in said LUT corresponding to a transformed version of said input data, wherein the remaining n-k bits of said masked input data are used to select said entry.

2. The method of claim 1 wherein said plurality of LUTs are implemented in read only memory.

3. The method of claim 1 wherein said plurality of LUTs are implemented in hardware as synthesized logic.

4. The method of claim 1 wherein said masked input data is mapped to said LUT using a decoder that is controlled by bit values of said masked input data and by bit values of said additive component of said multiplicative-additive mask.

5. The method of claim 4 wherein said decoder comprises a cascade of two-to-two decoders, wherein said cascade comprises a two-to-two decoder comprising a de-multiplexer having two outputs, wherein both said outputs are provided as inputs to each of two multiplexers, and wherein both said multiplexers are controlled according to a value of a corresponding bit of said additive component of said multiplicative-additive mask.

6. The method of claim 4 wherein outputs of said decoder are provided as inputs to a cascade of multiplexers, wherein each of said multiplexers is controlled according to a value of a corresponding bit of said additive component of said multiplicative-additive mask.

7. A data processing method comprising:
masking an n-bit input value with a random additive mask to produce an n-bit masked input value;
replacing said additive mask with a multiplicative-additive mask comprising an additive component, wherein said additive component comprises n/2 bits;
using the n/2 most significant bits of said masked input data and said additive component in combination to select a lookup table (LUT) from a plurality of LUTs, wherein there are up to $2^{(n/2)}$ LUTs in said plurality of LUTs and up to $2^{(n/2)}$ entries per LUT, wherein said LUT is selected using a swap operation in which indices of said LUTs are exchanged according to bit values of said additive mask; and
using the n/2 least significant bits of said masked input data to select an entry in said LUT corresponding to a transformed version of said input data.

8. The method of claim 7 wherein said plurality of LUTs are implemented in read only memory.

9. The method of claim 7 wherein said plurality of LUTs are implemented in hardware as synthesized logic.

10. The method of claim 7 wherein said masked input value is mapped to said LUT using a decoder that is controlled by bit values of said most significant bits and by bit values of said additive component of said multiplicative-additive mask.

11. The method of claim 10 wherein said decoder comprises a cascade of two-to-two decoders, wherein said cascade comprises a two-to-two decoder comprising a de-multiplexer having two outputs, wherein both said outputs are provided as inputs to each of two multiplexers, and wherein both said multiplexers are controlled according to a value of a corresponding bit of said additive component of said multiplicative-additive mask.

12. The method of claim 10 wherein outputs of said decoder are provided as inputs to a cascade of multiplexers, wherein each of said multiplexers is controlled according to a value of a corresponding bit of said additive component of said multiplicative-additive mask.

13. A data processing system comprising:
- a mask generator operable for generating a random mask that is applied to input data to generate masked input data and to transform said mask into a multiplicative-additive mask comprising an additive component, wherein said additive component comprises k bits and said input data comprises n bits; and
- a decoder coupled to said mask generator and operable for selecting a lookup table (LUT) from a plurality of LUTs using a first subset of said masked input data and said additive component in combination, wherein there are up to $2^k$ LUTs in said plurality of LUTs and up to $2^{n-k}$ entries per LUT, wherein said LUT is selected using a swap operation in which indices of said LUTs are exchanged according to bit values of said additive mask, wherein k bits of said masked input data are used with said additive component to select said LUT, said decoder also operable for selecting an entry in said LUT using a second subset of said masked input data, wherein the remaining n-k bits of said masked input data are used to select said entry, said entry corresponding to a transformed version of said input data.

14. The system of claim 13 wherein said LUT is implemented in read only memory.

15. The system of claim 13 wherein said LUT is implemented in hardware as synthesized logic.

16. The system of claim 13 wherein said decoder comprises a cascade of de-multiplexers and a cascade of multiplexers interleaved with said cascade of de-multiplexers, wherein said de-multiplexers include a de-multiplexer having two outputs, wherein both said outputs are provided as inputs to each of two multiplexers and wherein both of said two multiplexers are controlled according to a value of a corresponding bit of said additive component of said multiplicative-additive mask.

17. The system of claim 13 further comprising a cascade of multiplexers downstream of said decoder, wherein outputs of said decoder are provided as inputs to said multiplexers and wherein each of said multiplexers is controlled according to a value of a corresponding bit of said additive component of said multiplicative-additive mask.

\* \* \* \* \*